United States Patent [19]

Ban

[11] Patent Number: 4,697,782

[45] Date of Patent: Oct. 6, 1987

[54] STRUCTURE FOR MOUNTING ENGINE AUXILIARIES

[75] Inventor: Megumu Ban, Okazaki, Japan

[73] Assignee: Toyota Jidosha Kabushiki Kaisha, Japan

[21] Appl. No.: 891,925

[22] Filed: Jul. 30, 1986

[30] Foreign Application Priority Data

Aug. 27, 1985 [JP] Japan .......................... 60-129489[U]

[51] Int. Cl.[4] .............................................. F16M 13/00

[52] U.S. Cl. ............................... 248/639; 123/195 A; 248/674

[58] Field of Search ........................ 248/639, 666, 674; 474/148, 87, 150; 180/300; 123/195 A, 195 C, 198 E

[56] References Cited

U.S. PATENT DOCUMENTS 2,508,756 5/1950 Jackoboice ....................... 474/87 X 2,856,785 10/1958 Steele ............................. 248/666 X 2,875,746 3/1959 Brice et al. ..................... 123/195 A

FOREIGN PATENT DOCUMENTS 2854992 12/1978 Fed. Rep. of Germany ... 123/195 A

*Primary Examiner*—Robert W. Gibson, Jr.
*Assistant Examiner*—David L. Talbott
*Attorney, Agent, or Firm*—Parkhurst & Oliff

[57] ABSTRACT

A structure for mounting, on an engine body, a plurality of auxiliaries such as an alternator, a compressor for an air conditioner, a power steering device, and the like, which are driven via respective belts by a crank pulley of the engine of the vehicle. The auxiliaries are fixed on a single structured bracket at one sides thereof in multistages. The adjacent auxiliaries are rigidly connected to each other by means of respective brackets at other sides thereof opposite from the single structured bracket.

4 Claims, 1 Drawing Figure

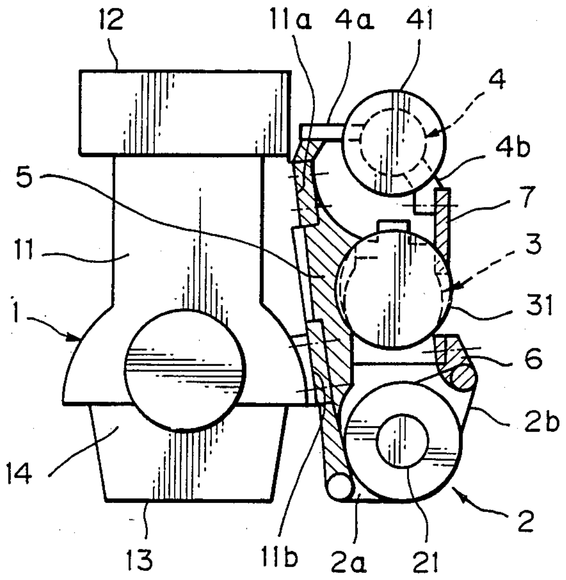
12
11a
4a
41
4
4b
5
7
3
11
31
1
6
2b
14
2
13
11b
2a
21

STRUCTURE FOR MOUNTING ENGINE AUXILIARIES

BACKGROUND OF THE INVENTION

1. Field of the Invention

This invention relates to a structure for mounting engine auxiliaries, and more particularly, to a structure for mounting auxiliary elements such as an alternator, a compressor for an air conditioner, a power steering assembly, or the like, which are driven via belts from a crank from pulley of an engine of a vehicle.

2. Description of the Related Art

Demands for an up-grading of the vehicle's performance, and improvements to the steering facilities, have brought various engine auxiliary elements, such as an alternator, a compressor for an air conditioner, a power steering assembly, and the like, into an increasing and wider use, and these auxiliary elements are generally mounted on an internal combustion engine body of a vehicle. These auxiliaries mounted on the engine body are usually driven by respective driving belts from a crank pulley of the engine of the vehicle. Accordingly, if the number of these auxiliaries is increased, and if the sizes thereof are also increased, it will become more and more difficult to obtain sufficient space in the engine compartment for mounting these auxiliaries, and in addition, vibration or noise will be increased in relation to the number of these auxiliary elements.

The above-mentioned engine auxiliaries conventionally are fixedly mounted on the engine body by means of brackets, which are relatively heavy and large in size, to increase the rigidity thereof. The brackets, on which the auxiliaries are rigidly mounted, are also rigidly mounted on a cylinder block of the engine. This, however, increase both the weight of the engine and the fuel consumption thereof since the brackets are heavy and large.

In some cases, a plurality of engine auxiliaries are mounted on the engine body by means of multistage respective brackets. This means, however, that the space necessary for mounting these brackets must be increased, which gives rise to difficult problems in the mounting or assembling efficiency thereof.

In other cases, a plurality of engine auxiliaries are mounted on the engine body by means of a single multistage bracket. However, the rigidity of each auxiliary is reduced at the side opposite from the bracket, which increases cause vibration and noise.

SUMMARY OF THE INVENTION

An object of the present invention is to provide a structure for mounting engine auxiliaries in such a way that, even if a plurality of auxiliaries are mounted on the engine body by means of a multistage single bracket, the rigidity of each auxiliary is not reduced at the side opposite from the bracket, preventing the generation of vibration and noise, and improving the mounting or assembling efficiency for these auxiliaries.

According to the present invention, there is provided a structure for mounting a plurality of engine auxiliaries on an engine body, the auxiliaries being driven by respective belts from a crank pulley of the engine of the vehicle, the structure comprising: a single structured bracket rigidly attached to the engine body, and the plurality of engine auxiliaries are fixed on the single structured bracket at their one sides in a multistages manner; and, respective brackets provided rigidly connecting the adjacent engine auxiliaries to each other at their sides opposite from the single structured bracket.

BRIEF DESCRIPTION OF THE DRAWING

The single drawing is a schematic illustration of an embodiment of an engine auxiliaries mounting structure according to the present invention.

DESCRIPTION OF THE PREFERRED EMBODIMENTS

Referring now to the single drawing, a vehicle internal combustion engine comprises an engine body 1 including a cylinder block 11, a cylinder head 12, and an oil pan 13. On the engine body 1, various auxiliary elements, such as an alternator 2, a compressor 3 for an air conditioner, a power steering assembly 4, and the like, are mounted in such a manner that the main shafts or spindles of these auxiliary elements 2, 3, and 4 are arranged in parallel to a crankshaft of the engine extending perpendicular to the sheet of this drawing. These auxiliary elements 2, 3, and 4 are provided with pulleys 21, 31, and 41, respectively, which are driven by an engine crank pulley 14 via respective belts, not shown in the drawing.

At one side of the engine body 1, a single structured bracket 5 is rigidly attached to side walls **11*a* and 11*b* of the cylinder block 11 by mean of bolts, as schematically indicated by dotted lines. The auxiliary elements, i.e., the alternator 2, compressor 3 for an air conditioner, power steering assembly 4, or the like, are fitted in a multistage arrangement or tandem on the single structured bracket 5 at the opposite side of the cylinder block 11 with small clearance maintained between the adjacent auxiliary elements and rigidly mounted thereon at one sides thereof by means of bolts, not shown in the drawing. These auxiliary elements may be directly attached to the single structured bracket 5, or also may be attached thereto via other stages or the like, as shown at 2*a* and 4*a* in the drawing. On the other hand, these auxiliary elements are rigidly connected to each adjacent element at the other sides thereof by means of respective brackets 6 and 7. That is to say, in FIG. 1, a right upper portion of the alternator 2 and a right lower portion of the air conditioner compressor 3 are connected to each other by means of the bracket 6 and bolts (not shown). In addition, a right upper portion of the air conditioner compressor 3 and a right lower portion of the power steering device 4 are connected to each other by means of the bracket 7 and bolts (not shown). These auxiliary elements may be directly connected to the brackets 6 and 7, or may be connected thereto via other stays or the like, as shown at 2*b* and 4*b*** in the drawing.

While the engine is in a running condition, vibration is transmitted from the engine body 1 to the single structured bracket 5 and top the auxiliary elements 2, 3, and 4. According to the embodiment as mentioned above, however, since the auxiliary elements 2, 3, and 4 are rigidly connected to each adjacent element at the other sides thereof by means of the brackets 6 and 7, the cylinder block 11 of the engine, and the single structured bracket 5, the auxiliary elements 2, 3, and 4, and the respective brackets 6 and 7 are united as a single rigid body obtained from the rigidity of each of these auxiliary elements 2, 3, and 4. Therefore, a sufficient rigidity is obtained in this single united body to ensure that engine vibration is diminished and noise reduced.

As mentioned above, according to the present invention, the rigidity of a plurality of auxiliary elements 2, 3, and 4 is increased by the simple brackets 6 and 7 rigidly connected these elements at the other sides thereof, so that advantages such as a diminished engine vibration and reduced noise, can be attained. In addition, there is a further advantage in that these auxiliary elements 2, 3, and 4 can be arranged relatively near to the adjacent element, which make it possible to provide sufficient space in an engine compartment to accommodate various engine parts or auxiliaries.

I claim:

1. A structure for mounting a plurality of engine auxiliaries on an engine body, said auxiliaries being driven via respective belts by a crank pulley of the engine of a vehicle, said structure comprising:

a single structured bracket rigidly attached to the engine body, said plurality of engine auxiliaries being fixed on said single structure bracket at first sides thereof in multistages; and, a plurality of brackets for rigidly connecting adjacent engine auxiliaries to each other at second sides thereof, said second sides of the engine auxiliaries being opposite said first sides and said single structured bracket.

2. A structure as set forth in claim 1, wherein said engine auxiliaries comprise an alternator, a compressor for the air conditioner, and a power steering device.

3. A structure as set forth in claim 1, wherein each of said engine auxiliaries comprises a main shaft or spindle, which is parallel to a crankshaft of the engine, said main shaft or spindle being operatively connected to said crank pulley of the engine via the respective belt.

4. A structure as set forth in claim 1, wherein said engine body comprises a cylinder block having side wall portions, and said single structured bracket is rigidly attached to said side wall portions of the cylinder block.

* * * * *